United States Patent [19]

Patzschke et al.

[11] 4,454,264

[45] Jun. 12, 1984

[54] HEAT CURABLE AQUEOUS LACQUER COATING COMPOSITION, ITS USE FOR ELECTRICAL DEPOSITION, AND A PROCESS OF CATHODIC DEPOSITION ONTO AN ELECTRICAL CONDUCTIVE SUBSTRATE

[75] Inventors: Hans-Peter Patzschke; Armin Göbel, both of Wuppertal, Fed. Rep. of Germany

[73] Assignee: Herberts Gesellschaft mit beschrankter Haftung, Wuppertal, Fed. Rep. of Germany

[21] Appl. No.: 279,952

[22] Filed: Jul. 2, 1981

Related U.S. Application Data

[63] Continuation of Ser. No. 91,169, Nov. 5, 1979, abandoned.

[30] Foreign Application Priority Data

Nov. 6, 1978 [AT] Austria ................................. 7899/78

[51] Int. Cl.³ .............................................. C08L 63/02
[52] U.S. Cl. ................................ 523/414; 204/181 C; 523/410; 523/413; 523/415; 523/426; 524/514; 524/591; 524/592; 524/598; 524/901
[58] Field of Search ............... 523/414, 426, 415, 410, 523/413; 524/901, 598, 591, 592; 204/181 C; 525/528

[56] References Cited

U.S. PATENT DOCUMENTS

| | | | |
|---|---|---|---|
| 3,935,087 | 1/1976 | Jerabek et al. | 204/181 |
| 4,001,101 | 1/1977 | Bosso et al. | 204/181 |
| 4,134,866 | 1/1979 | Tominaga et al. | 523/415 |
| 4,248,753 | 2/1981 | Buchwalter et al. | 523/416 |

FOREIGN PATENT DOCUMENTS

| | | |
|---|---|---|
| 1304480 | 1/1973 | Fed. Rep. of Germany . |
| 2603666 | 8/1976 | Fed. Rep. of Germany . |
| 2707482 | 1/1978 | Fed. Rep. of Germany . |
| 2265195 | 4/1978 | Fed. Rep. of Germany . |

*Primary Examiner*—Theodore E. Pertilla
*Attorney, Agent, or Firm*—Dennis P. Clarke

[57] ABSTRACT

Paint coating material capable of cathodic deposition based on a vehicle mixture that has been made water-thinnable with acid and optionally customary additives, wherein said vehicle contains in combination (A) from 50 to 90% by weight of a polymer and/or polycondensate containing tertiary amino-groups and OH groups and having amine and hydroxy numbers of from 30 to 170 and 30 to 300 respectively;

(B) from 5 to 40% by weight of a fully blocked polyisocyanate which is stable in the aqueous phase and becomes reactive again under the influence of heat, after dissociation of the blocking group; and (C) from 0 to 30% by weight of polymer and/or polycondensate containing primary and/or secondary OH- and/or amino-groups.

5 Claims, No Drawings

HEAT CURABLE AQUEOUS LACQUER COATING COMPOSITION, ITS USE FOR ELECTRICAL DEPOSITION, AND A PROCESS OF CATHODIC DEPOSITION ONTO AN ELECTRICAL CONDUCTIVE SUBSTRATE

This application is a continuation of application Ser. No. 091,169, filed Nov. 5, 1979 abandoned.

The production of water-thinnable resins by introduction of amino-groups into the desired resin material and salt formation with organic acids is known. These quaternary ammonium salts do yield very serviceable films that can be cathodically deposited on metallic bodies; the requirements desired in practice, however, are not fulfilled in all cases.

West German Examined patent application No. 23 63 074 describes self-hardening polyurethane resins, produced by reaction of an epoxy-group-containing resin, which, in addition, contains OH-groups, with a partially blocked organic polyisocyanate and, in addition, dialkylaminoalkylcarboxylic acids or corresponding alcohols. It is explained on this point in column 7, line 58 et seq. that the nature of the solubilising groups is less important than the presence of a tertiary N-atom. N-atoms with any alkyl-groups can therefore be employed. Variations in reproducibility occur in the reaction with the partially blocked organic polyisocyanates, because the differences in reactivity between the individual isocyanate-groups are not very great, so that varying proportions of unblocked and fully blocked polyisocyanates are formed, which leads to marked variations in properties and to stability problems.

West German Unexamined patent application No. 27 53 861 describes vehicles, which are rendered basic by addition of secondary amines to unsaturated double bonds and which, by way of excess double bonds, are oxidatively drying or self-cross-linking. Structure is not taken into account in the choice of the amines. The substituents can be varied in the C-chain very widely. The number of unsaturated double bonds, required for adequate crosslinking, can be frequently introduced into the intended resin material only with difficulties. At a lower content of double bonds, the crosslinking density diminishes and thus the anti-corrosive protection deteriorates. Incorporation of functional groups for crosslinking with suitable blocked polyisocyanates is not mentioned.

In West German Unexamined patent application No. 20 57 799 and West German Unexamined patent application No. 21 31 060, mixtures of certain water-thinnable vehicles with fully blocked polyisocyanates are used. The synthetic polyamine resins, selected in this case are polyamino-amide resins, reaction products of acrylic acid copolymers with alkylene-imines and polyureas or polyurethanes containing terminal amino-groups. Application of these combinations is limited by insufficient compatibility or stability of these dispersions. The water-insoluble blocked polyisocyanates are frequently precipitated on prolonged standing.

West German Unexamined patent application No. 27 51 869 describes vehicles for cathodic deposition, containing a reaction product of a polymeric tertiary amine and of a 1,2-monoepoxide. The coatings produced on this basis, however, are hard only in some cases, in some cases even tacky, even at stoving temperatures of 204° C., (cf. the examples). There is an urgent need of vehicles, which yield hard coatings already at lower stoving temperatures.

Vehicles for cathodic deposition are known from West German Unexamined patent application No. 25 31 960, which consists of reaction products of a tertiary amine acid salt or of a sulphide/acid mixture with a polyepoxide, on the one hand, and a blocked organic polyisocyanate, on the other. The disadvantage of the resulting deposited coatings is that the ammonium-group, with its electric charge, is retained in the stoved film and represents trouble-spots.

It is an object of the present invention to avoid these disadvantages and, by suitable combination of selected synthetic resins, to improve the scope of application in fields with stringent requirements and to provide wider properties. In contrast to the assertion that amino-groups act as corrosion inhibitors, it has been surprisingly observed that deterioration of adhesion and thus also of anti-corrosive protection occurs with increasing amine-content. Besides, it is important, in practice, to work in pH-value ranges which avoid destructive attack of the neutralising agent on the walls of the tank and the objects to be coated. First, production of stable water-thinnable solutions, having a pH-value of from 5 to 8, and, secondly, the maximum possible diminution of the polar groups, required for solubility during stoving are therefore regarded as the criteria for selection. The problem is solved by using thermally unstable N-groups and by further reducing the polarity of the residual molecule, in addition, by reaction with blocked isocyanates, particularly blocked isocyanates containing amino-groups. This combination makes it possible to lower the hardening temperature of the resin type used in West German patent application No. 27 53 861.

The subject of the invention is an aqueous heat-hardenable paint coating material, based on a vehicle mixture that has been made water-thinnable with acid and, optionally, customary additives, wherein said vehicle contains in combination (A) from 50 to 95% by weight of a polymer and/or polycondensate, containing tertiary amino-groups and OH-groups, (Component A),

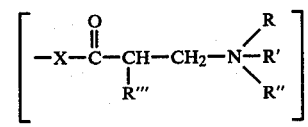

in which:
X=—O—, —NH— or —C$_6$H$_4$—,
R=C$_n$H$_{2n+1}$ and n=from 1 to 5,
R'=C$_m$H$_{2m+1}$ and m=from 1 to 5,
n+m=from 2 to 6,
or R+R', in combination with the N-atom, form a piperidine ring or morpholine ring;
R''=—H, —C$_p$H$_{2p+1}$ or —C$_p$H$_{2p}$OH and p=from 1 to 3,
R'''=—H, —CH$_3$ or —C$_2$H$_5$,
and having an amine number of from 30 to 170, especially from 60 to 120, and an OH-number of from 30 to 300;

(B) from 5 to 40% by weight of a fully blocked polyisocyanate, (Component B), which is stable in the aqueous phase and becomes reactive again under the influence of heat, after dissociation of the blocking group;

(C) from 0 to 30% by weight, especially from 5 to 20% by weight, of a polymer or polycondensate, containing primary and/or secondary OH- and/or amino-groups, (Component C).

The amines formed during the thermal $\beta$-elimination possess high volatility, (Kp of from $-10°$ to $+160°$ C., especially from 5° to 115° C.), and as high basicity as possible (pK$_b$-value of from 2.5 to 5.5, especially from 2.8 to 4.0).

The amine number of Component B suitably ranges from 10 to 120, especially from 25 to 100.

The amine number of Component C suitably ranges from 0 to 250, preferably from 20 to 200, with particular preference from 30 to 100, and the OH-number suitably from 30 to 500, preferably from 100 to 300.

The vehicles according to the invention are particularly well suited to the cathodic electrophoretic coating of electrically conductive surfaces, especially of metal parts, such as iron. Strongly adhering coatings are formed on the cathode, having very high stability towards alkalis and salt spray fog, which already proves to be advantageous in the absence of anti-corrosive inhibitors on non-bonderized bright metal sheets and shows particularly high elasticity values.

The component A used is a resin, which contains a hydrogen atom on the $\beta$ C-atom of the tertiary or quaternary amine and is additionally acidified by a polar C=O group. Components of this kind decompose on heating by $\beta$-elimination into olefins and the corresponding amines. The amines, formed in this case, should possess high basicity and volatility. The effect of this structure is that excellent water-thinning ability is attained at a pH-value of from 5 to 8 and a large part of the amine is thermally dissociated on stoving the film. Suitable results are attained on using reaction products, derived from secondary amines, such as dimethylamine, diethylamine, N-methyl isobutylamine, N-methyl sec-butylamine, N-methyl ethanolamine, piperidine or morpholine. The ease of dissociation is influenced by quaternation of the N-atom and can be catalysed by strong bases.

The level of the pH-value and of the conductivity of the bath are influenced by the degree of neutralisation and the amine number. Amine numbers of from 30 to 170, especially from 60 to 120, i.e. about from 0.5 to 3.0, especially from 1.0 to 2.1, milli-equivalents of amine per gramme of solid resin, have proved to be acceptable in operational practice. With a higher amine number, a higher pH-value and a higher bath conductivity are attained at constant degree of neutralisation. The solubility of the resin is considerably improved by an OH-number of from 30 to 300, i.e. about from 0.5 to 5.3 milli-equivalents OH per gramme of solid resin. The OH-groups are formed in the reaction of the epoxy-groups with $\alpha,\beta$-unsaturated monomers, by the use of amino-alcohols during the amine addition or by the introduction of excess unsaturated OH-monomers into the copolymer. The viscosities of Component A range from 400 to 6000 mPas, approximately, measured at 25° C. after dilution with butyl glycol to 60% by weight. In order to attain a high deposition voltage, as high a viscosity,—i.e. as high a mean molecular weight,—is aimed at as can be justified without impairing flow and ease of pigmentation.

A suitable mean molecular weight can also be obtained by mixing two resins having differing values for mean molecular weight.

Component A is produced by known methods, e.g. by addition of reactive basic NH-compounds with $\alpha,\beta$-unsaturated carboxylic acid polyesters or by condensation or addition of dialkylamino-propionic acid or aminoacetophenone on suitable reactive basic structures. Examples of $\alpha,\beta$-unsaturated carboxylic acid polyesters are reaction products of COOH-containing acrylic resins with glycidyl (meth) acrylate; acrylic resins, containing OH-groups, or alkyd resins with unsaturated monoisocyanates;

resins containing epoxy-groups with $\alpha,\beta$-unsaturated monocarboxylic acids, $\alpha,\beta$-unsaturated (meth) acrylamides or semi-esters of $\alpha,\beta$-unsaturated dicarboxylic acids with hydroxy-alkyl (meth) acrylates.

Addition of the reactive amine takes place stoichiometrically; excess of double bonds, however, has no ill effect. Care is to be taken by control of the reaction that the whole of the amine is reacted. The exothermic reaction is carried out in substance or in the presence of solvents, such as isopropanol, sec-butanol, ethoxyethanol, butoxy-ethanol, xylene or methyl isobutyl ketone at temperatures of from 20° to 100° C., in which case the solvents can either remain in the resin or have to be distilled off, optionally in vacuo, after the reaction.

For the production of $\alpha,\beta$-unsaturated carboxylic acid polyesters, resins containing epoxy-groups prove to be particularly suitable, which contain more than one epoxy-group per molecule and which are produced by
(a) introduction of glycidyl-groups via e.g. epichlorhydrin
 (aa) into OH-functional resins, viz. polyglycidyl ethers, epoxy-novolacs;
 (ab) into COOH-functional resins, viz. polyglycidyl esters;
 or
 (ac) into NH$_2$-functional resins, viz. polyglycidylamines;
(b) polymerisation of glycidyl (meth) acrylate into a suitable monomer mixture, of e.g. styrene and/or (meth) acrylic esters of different chain length and/or hydroxyalkyl (meth) acrylates.

Particularly preferred as resins, containing epoxy-groups, according to (a) are polyglycidyl ethers of the general formula:

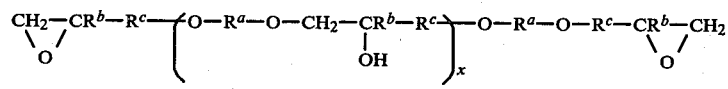

in which

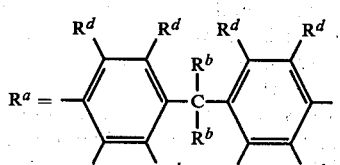

$R^b$=hydrogen or $-C_xH_{2x+1}$
$R^c=-(CR^b{}_2)_x-$ $R^d = -R^b$ or halogen, preferably nitrogen x=from 0 to 3 having a mean molecular weight ($\overline{Mn}$) of from 300 to 3000, approximately, and an epoxy equivalent weight of from 180 to 2200, approximately. The symbols $R^b$, $R^c$ and/or $R^d$ can have identical or different meanings in each case. These resins can also be employed in the hydrogenated form. In order to control the properties of the film obtained, it is frequently necessary to react part of the reactive groups of an epoxy-resin with a modifying material, e.g. saturated or unsaturated carboxylic acids or amines.

For example, bis-(4-hydroxyphenyl)-2,2-propane, 4,4'-dihydroxy-benzophenol, bis-(4-hydroxyphenyl)-1,1-ethane, bis-(4-hydroxy-tert.butylphenyl)-2,2-propane, bis-(2-hydroxynaphthyl)-methane or 1,5-dihydroxynaphthalene are used for the etherification of a polyphenol with epichlorhydrin in the presence of alkali.

Epoxidised polyglycidyl ethers are produced not only on the basis of bisphenol A, but may also contain other base components, such as triglycidyl isocyanurate, heterocyclic diglycidyl compounds (West German Unexamined patent application No. 18 16 095), substituted hydantoins (U.S. Pat. No. 3,391,097) or epoxidised natural or synthetic oils, such as butadiene oil, of different configuration.

It is preferred that the resins, containing epoxy-groups, are glycidyl/(meth)acrylate copolymers, having a mean molecular weight ($\overline{Mn}$) of from 800 to 8000, approximately, and an epoxy equivalent weight of from 800 to 3000, which have been obtained by copolymerisation of glycidyl (meth) acrylate with unsaturated monomers. Unsaturated monomers are, for example, styrene, vinyl toluene, (meth) acrylic esters of different chain length, in which case the (meth)acrylic esters preferably contain $C_1$ to $C_4$ alcohols and the acrylic ester preferably contain $C_2$ to $C_8$ alcohols.

Optionally, monomers containing hydroxyl-groups, such as hydroxyalkyl(meth)acrylic esters, e.g. 2-hydroxypropyl methacrylate, 1,4-butane-diol acrylate or hydroxyethyl acrylate, or etherified methylol derivatives of (meth) acrylamide, can be used as additional component.

Copolymerisation is effected in organic solvents, such as alcohols or glycol ethers, at from 60° to 145° C., approximately, with addition of radical initiators, such as peroxides, hydro-peroxides, peresters or thermally dissociable azo-compounds.

Moreover, Component A can however be produced by other known means as well, such as by reaction of the above-described resins, containing epoxy-groups, with dialkylaminopropionic acid. Another production method is the formation of imides of maleinised natural or synthetic oils, such as butadiene oil, of diverse configuration, with aminoacetophenone and subsequent reaction with formaldehyde and secondary amines.

Crosslinking agents, which are emulsified into the water-thinnable resin, capable of cathodic separation, are fully blocked polyisocyanates, (Component B). They should be storage-stable in the aqueous phase and crosslink with the reactive hydroxyl groups, which are still present in the resin structure, under the influence of heat, after dissociation of the protective groups.

Suitable polyisocyanates are all the polyisocyanates known in polymer chemistry, that are based on aromatic, aliphatic and/or cyclo-aliphatic parent substances, having at least two isocyanate groups per molecule. Typical examples are the isomers or isomer mixture of toluylene diisocyanate, of 4,4'-diphenylmethane diisocyanate and of their hydrogenation products as well as isophorone diisocyanate or hexane-1,6-diisocyanate and their higher-molecular polyisocyanates, formed by trimerisation, reaction with water or polyalcohols. Higher-molecular polyisocyanates can be produced by reaction with polyethers, polyesters, polyamides, polylactones or butadiene oil diols with excess polyisocyanates. Blocking-groups used are phenols, cresols, thiophenols, oximes, lactams, aceto-acetic ester, acetylacetone, malonic ester, phthalimide, imidazole or alcohols.

In order to promote the compatibility of Components A and B and improve the solubility in water, those fully blocked polyisocyanates are advantageously employed that contain basic N-groups, e.g.

1. Polyisocyanates with blocking groups containing amino-groups, produced by reaction of polyisocyanates with e.g. N-dialkyl-aminophenols, N-dialkylaminoketoximes or dialkylaminoalcohols at temperatures of from 40° to 90° C., approximately, in anhydrous medium. Appropriately, the alkyl-groups contain from 1 to 5, preferably 1 or 2, carbon atoms. On stoving, they split off the blocking-group again and do not upset the amine content in the film.

2. Polyisocyanates that are linked with tertiary amino-polyalcohols, such as N-methyldiethanolamine, triethanolamine or ketimine-polyalcohols, e.g. a ketimine produced by elimination of water from aminomethylpropanediol and methyl isobutyl ketone. These products virtually no longer dissociate the N-atom and frequently show higher reactivity, with good compatibility. In the case of the ketimine, a primary amino-group is released on dissolving the resin in water, which can be additionally reacted with other fully blocked isocyanates to urea.

Preferably, fully blocked polyisocyanates, having an amine number of from 10 to 120, especially from 25 to 100, are used. The choice of the production technique depends on the desired properties of the bath and of the film. According to method 2, higher-molecular resins are obtained, which show better compatibility, combined with higher deposition voltages and higher film elasticities. If such fully blocked polyisocyanates with high amine numbers are desired, they must additionally possess blocking-groups containing amino-groups.

The ratio of Component A to Component B lies between 95 to 5 and 60 to 40% by weight, approximately. The equivalent ratio existing between NCO-groups and OH-groups is such that there is about 1 free OH-group to from 0:1 to 1 fully blocked isocyanate. Approximately stoichiometric ratios are preferred. Incorporation of the crosslinking agent is effected in such a way that the resins A and B are mixed as concentrates, subsequently jointly neutralised and gradually diluted with water. Hardening of the mixture is effected by stoving for approximately 15 minutes to 1 hour at above 120° C., preferably at from 160° to 210° C., approximately. The stoving temperature can be lowered by admixing suitable catalysts, at a concentration of from 0.1 to 4% by weight, approximately, related to the resin solids. Organic metal compounds, such as zinc octoate, dibutyl tin dilaurate, iron acetyl-acetonate or zinc acetyl-acetonates, are suitable for this purpose.

It is useful, for balancing the performance properties, for the cathodically separable vehicle also to contain, apart from the crosslinking agent, in addition, up to 30% by weight, preferably from 5 to 20% by weight, of a reactive resin, containing NH-groups or OH-groups and provided with blocked polyisocyanates, (Component C). Thus, for enhancing throwing power, resins containing hydroxyl groups, having an OH-number of from 30 to 500, especially from 100 to 300, and a mean molecular weight of from 500 to 5000, can be employed, e.g. styrene/alkyl alcohol copolymers, (meth)acrylic copolymers, containing OH-groups, caprolactone polyols, urethane polyols, polyesters, containing OH-groups, polyethers, containing OH-groups or, again, epoxy resin esters, containing OH-groups.

For achieving better compatability and water-solubility, these resins containing hydroxyl-groups, also possess an amine number of from 0 to 250, preferably from 20 to 200 and, particularly advantageously, from 30 to 100. These polyamino-alcohols are obtained e.g. by reaction of solid or liquid polyglycidyl ethers or polyglycidyl esters, based on bisphenol A, with dialkylamines or alkanolamines, which also contain a reactive NH-group, such as diethanolamine, diisopropanolamine, N-methyl-ethanolamine or N-cyclohexylethanolamine. When low-molecular polyglycidyl ethers are used, the molecular weight can be raised by incorporation of primary amines or amino-alcohols, such as isopropanolamine. The reaction conditions are selected such that all the epoxy-groups are split up and sufficient OH-groups, preferably primary OH-groups, are available for a further reaction. Since tertiary N-groups are no longer able to react with the crosslinking agent and, therefore, remain in the film as potential trouble-spots, it is useful to keep this content as low as possible. The quantity of polar groups is sufficient, which enables the resin to be satisfactorily emulsified in the water-soluble carrier resin, (Component A). The resins must lie in such a range of molecular weight that they are no longer volatile on stoving but achieve improved flowability for good film formation.

For elasticising the resins, the addition of resins containing NH-groups, such as polyaminoamides, have proved particularly useful as Component C. They are produced by polycondensation of lower aliphatic polyamines and/or amino-alcohols, optionally mixed with polyols, with polybasic carboxylic acids and/or their anhydrides. Lower aliphatic polyamines and/or amino-alcohols, which are used in stoichiometric excess, are, for example, lower aliphatic polyamines, such as ethylene diamine or diethylene triamine, or amino-alcohols, such as dimethylaminoethanol or diisopropanolamine or mixtures of the latter. The polybasic acids employed are adipic acid, azelaic acid or, preferably, dimerised fatty acids. A low amine number is achieved by proportionate use of e.g. low-molecular polyols, such as neopentyl glycol, or higher polymeric polyols, such as polyester polyols, polyether polyols, or polycaprolactone polyols. The adjustment of suitable amine numbers to the molecular weight range is effected by addition of suitable chain-breaking agents, such as saturated or unsaturated monocarboxylic acids, monoalcohols or monoamines. Condensation is effected in the usual way in the melt or as azeotropic condensation at temperatures of from 150° to 250° C., approximately. This resin type is characterised by its high content of basic NH-reactive groups, which react with the crosslinking agent on stoving and are thus rendered harmless in the film.

Incorporation of the resins, containing OH-groups or NH-groups, is effected in the same way as that of the cross-linking agent. When polyaminoamide resins are employed, difficulties may arise through the high content of hydrogen bridges, (thixotropy). In these cases, it is then indicated to make a paste with addition of organic acids and water and to work this separately into the partially neutralised, unthinned vehicle mixture.

The various basic resin types, containing aminogroups, (Component A), can be used either alone or as a mixture of several resins with the corresponding crosslinking agent, (Component B), and Component C. Thus it may be necessary e.g. for adjusting the mechanical and electrical properties, for an epoxy resin ester, containing amino-groups, to be used together with a polyaminoamide resin. The mixture of these concentrates, which may be partially diluted with organic solvents, can also be heated to temperatures of from 50° to 200° C., preferably from 80° to 150° C., with stirring and under inert gas, until such time as the components, after dilution, have become mutually compatible. This precondensation, to a certain extent, leads to linkage of Components A and B or C and B, respectively. The course of the reaction can be easily observed by the change in viscosity of the condensation reaction. Viscosities of from 0.5 to 10 Pa s, preferably from 1 to 5 Pa s, after dilution to 50% by weight with monobutylglycol ether, are measured at 25° C. in this case. The reaction times range from about 1 to 5 hours. Heating is appropriately effected in a solution, from 60 to 95 percent by weight, preferably from 75 to 90 percent by weight, in organic solvents, preferably aliphatic alcohols, having from 1 to 6, suitably from 2 to 4, C-atoms, particularly suitably secondary alcohols or their monoglycol ethers. If precondensation is carried too far, first deterioration of the levelling of the film, afterwards gelation of the composition occur. The mixing ratio is chosen so that the sum of the equivalent of the OH-groups of Components A and C to the equivalents of the blocked isocyanates of Component B lies within the range of from 1:5 to 1:0.1, approximately, preferably from 1:3 to 1:1. A stoichiometric equivalent ratio is aimed at for particular preference.

Water-solubility is achieved by salt formation of the resin, containing amino-groups, with acidic compounds. For example, hydrochloric acid, acetic acid, formic acid, malonic acid, lactic acid, dimethylolpropionic acid, citric acid, boric acid, carbonic acid, phosphoric acid, acrylic acid etc. are suitable for this purpose. For achieving high bath conductivities, acids having as low a molecular weight as possible or a slight solvating envelope and acids that decompose into gaseous products on stoving the film, proved to be advantageous. Water-thinnable cationic resins, serving as vehicles, can be produced by adding to the basic resin or resin mixture from 0.2 to 1.2 equivalents, preferably from 0.3 to 0.8 equivalent, of the acidic compound, related to the basic nitrogen atom in the resin mixture, and stirring the mixture at temperatures of from 20° to 90° C., approximately. For lowering the viscosity, for controlling the deposition voltage and for the improvement of flow, the bath may contain up to 15% by weight, approximately, of organic solvents. In this case, water-soluble solvents, such as alcohols, glycol ethers, keto-alcohols or cyclohexanone, as well as small proportions of water-insoluble solvents, such as hydrocarbons of different chain length, can be used. The aim is to keep the solvent content as low as possible.

The solids content of the paint, in which the coating material according to the invention is contained in diluted form, depends on the coating method in question. For immersion without application of an electric potential or for spraying, solids contents of from 30 to 60% by weight are suitable. For cathodic deposition from a paint bath on electrically conductive surfaces, it ranges, after dilution with water, suitably from 5 to 30% by weight, preferably from 10 to 20% by weight. The pH-value of the paint generally lies between 5.0 and 7.5, preferably between 6.0 and 7.0. Electrophoretic deposition is suitably effected 24 hours after preparation of the bath at the earliest. Appropriately, the bath is continuously stirred during this period, so as to achieve uniform distribution. Electrically conductive, non-corroding electrodes, e.g. of stainless steel or graphite, are used as anode. The object that is to be cathodically coated and the anode are immersed into an aqueous bath in the manner as is known for electrophoretic deposition. The bath is kept at temperatures suitably of from 20° to 35° C. during deposition. Solids, deposition temperature and deposition time as well as voltage are selected so that the desired layer thickness is obtained after rinsing and stoving.

The concentrates, having a solids content of from 85 to 60% by weight, can be pigmented in the usual way, e.g. by means of a ball-mill, triple roller or bead-mill and can be applied, after thinning to application consistency, by all the customary coating methods, (brushing, roller application, spraying and dipping).

For pigmentation, customary pigments, fillers, corrosion inhibitors and auxiliary paint additives, such as antifoaming agents or driers, can be used, as long as they do not enter into objectionable reactions with water within the acid pH-range, do not entrain any water-soluble foreign ions and do not precipitate on ageing. The paints are particularly suited to the electrophoretic coating of metals and, after stoving, yield smooth hard films having good adhesive power and elasticity as well as particularly good corrosion resistance. The pigment/binder ratio depends on the viscosity of the vehicle and generally lies between 0.1:1 and 1.5:1.

Basic resin A (Component A)

754 g of a 75% solution of a polyglycidyl ether, based on bis-phenol A (Epikote 1001) and having an epoxy-equivalent weight of about 475, in technical xylene are filled, with addition of 1.5 g triphenyl phosphine, into a reaction flask, equipped with reflux condenser, and heated up under inert gas and with slow stirring. A solution of 0.4 g of hydroquinone in 81.5 g of acrylic acid is added at from 50° to 60° C. and heated in one hour up to 130° C. The temperature is maintained until the acid number is from 20 to 25, approximately. Subsequently, heating is continued to 145° C. This temperature is maintained until the acid number is about 0.1 for a calculated solids content of 77% by weight. The mixture is then cooled to 100° C. and diluted with 115 g of butyl glycol.

| | |
|---|---|
| Solids: | 65.6% by weight, (measured by heating to 180° C. for 40 minutes) |
| Acid number: | 0.06 mg KOH/g of solid resin |
| OH-number: | 128 mg KOH/g of solid resin |
| Viscosity: | 1230 mPas, (measured after dilution with butyl glycol to 60% by weight at 25° C.) |

800 g of the solution thus obtained are heated to 60° C. and 61.4 g of diethylamine are added dropwise within about half an hour, the temperature rising to 80° C. The temperature is allowed to drop again to 60° C. and the xylene is distilled off in vacuo 3 hours after completion of the dropwise addition.

| | |
|---|---|
| Solids: | 81% by weight, (1 hour, 150° C.) |
| Viscosity: | 3604 mPas, (after dilution with butyl glycol to 60% by weight at 25° C.) |
| Amine number: | 80 mg KOH/g of solid resin |

The mixture is diluted with isopropanol to 75% by weight.

Polyisocyanate A (Component B)

1139 g of an aliphatic triisocyanate, containing biuret-groups and based on hexamethylene diisocyanate, (Desmodur N), are dissolved in 985 g of anhydrous ethyl acetate and heated to 80° C. After sprinkling in 339 g of ε-caprolactam, the temperature is maintained at 80° C. for 2 hours. Subsequently, 119 g of N-methyl diethanolamine are added dropwise during 15 minutes, approximately, and the temperature is again maintained at 80° C. for one hour. Subsequently, 113 g of ε-caprolactam are sprinkled in and the temperature is maintained at 80° C. for 2 hours. After the ethyl acetate has been distilled off, the mixture is diluted with secondary butanol to 80% by weight.

Amine number: 32 mg KOH/g of solid resin

Polyisocyanate B (Component B)

429 g of isophorone diisocyanate are heated to 80° C. 378 g of ε-caprolactam are then added during three hours sufficiently slowly for the reaction temperature not to exceed 100° C. Subsequently, this temperature is maintained until such time as the NCO-number has fallen below 0.1%. The mixture is diluted with butyl glycol to 80% by weight.

Polyaminoamide paste (Component C)

200 g of a commercial polyaminoamide resin, (Versamid 100), having an amine number of 88 and a viscosity of 760 mPas at 150° C., are heated with 100 g of butyl glycol to about 80° C. and the following portions are thoroughly stirred in at intervals of 15 minutes:

| | | |
|---|---|---|
| 1. | 8.4 | g acetic acid and 10.0 g water |
| 2. | 50 | g water |
| 3. | 100 | g water |
| 4. | 250 | g water |
| 5. | 615 | g water |

Subsequently, the mixture is thoroughly stirred at 80° C. for one hour.

Solids: 15.2% by weight, (measured after heating to 180° C. for 25 minutes)

EXAMPLE 1

226.7 g of Basic resin A were mixed with 37.5 g of Polyisocyanate B and gradually diluted with deionised water to a solids content of 10% by weight, with addition of 22.5 g of lactic acid (80%). The bath and film properties measured are summarised in Table 1. Electric breakdowns occurred at deposition voltages of above 150 volt.

Comparison 1

170 g of the polyaminoamide resin, having an amine number of 88 and a viscosity of 760 mPas at 150° C., (Versamid 100), were dissolved in 85 g of butyl glycol, mixed with 37.5 g of Polyisocyanate B and gradually diluted with deionised water, with addition of 22.5 g of lactic acid (80%). The diluted solution was foamy and thixotropic. No usable film could be deposited.

EXAMPLE 2

200 g of Basic resin A were first mixed with 37.5 g of Polyisocyanate B and then partially neutralised by addition of 27 g of lactic acid (80%). After slowly stirring in from 400 to 500 g of deionised water, 133 g of polyaminoamide paste were added. Subsequently, dilution with deionised water to a solids content of 10% by weight was effected. The dispersion may separate into two phases on prolonged standing.

EXAMPLE 3

200 g of Basic resin A were first mixed with 37.5 g of Polyisocyanate A and then partially neutralised by addition of 27 g of lactic acid (80%). After slowly stirring in from 400 to 500 g of deionised water, 133 g of polyaminoamide paste were added. Subsequently, dilution with deionised water to a solids content of 10% by weight was effected. The solution remained stable and was capable of satisfactory electrophoretic deposition. The film and bath properties measured are summarised in Table 1.

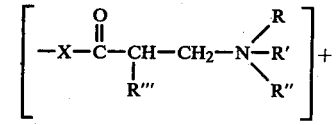

in which:

$X = -O-$, $-NH-$ or $-C_6H_4-$, $R = C_nH_{2n+1}$ and $N =$ from 1 to 5, $R' = C_mH_{2m+1}$ and $m =$ from 1 to 5, $n + m =$ from 2 to 6 or $R + R'$, in combination with the N-atom, form a piperidine ring or morpholine ring;

$R'' = -H$, $-C_pH_{2p+1}$ or $-C_pH_{2p}OH$ and $p =$ from 1 to 3, $R''' = -H$, $-CH_3$ or $-C_2H_5$ and having an amine number of from 30 to 170 and an OH-number of 30 to 300;

(B) from 5 to 40% by weight of a fully blocked polyisocyanate, (Component B), which is stable in aqueous phase and becomes reactive again under the influence of heat, after dissociation of the blocking group;

(C) from 5 to 30% by weight of a polyaminoamide resin, (Component C).

2. Paint coating material according to claim 1, characterized in that the resins of Component A contain addition amines, which, on thermal β-elimination, show high volatility, (Kp of from −10° to +160° C.), and as high basicity as possible (pK$_b$-value of from 2.5 to 5.5).

3. Paint coating material according to claim 1, characterized in that Component B possesses amino-groups

TABLE 1

| Experiment No | Example 1 | Comparison 1 | Example 2 | Example 3 |
|---|---|---|---|---|
| Basic resin A | + | − | + | + |
| Polyisocyanate A | − | − | − | + |
| Polyisocyanate B | + | + | + | − |
| Polyaminoamide paste | − | + | + | + |
| pH-value | 5.8 | 7.1 | 5.2 | 5.6 |
| conductivity (μScm$^{-1}$) | 2050 | 630 | 1970 | 1870 |
| meq. (lactic acid) | 90 | 100 | 103 | 125 |
| voltage 2'30" C. | 150V/15 μm | — | 120V/20 μm | 150V/20 μm |
| hardness (30'175° C.)(DIN 53157) | 227"/233" | — | 226"/226" | 197"/190" |
| surface | sat. | (o) | sat. | sat. |
| Erichsen indentation (DIN 53156) | 0.7 mm | | 2.4 mm | 8.8 mm |
| sedimentation test | sat. | | sat. | sat. |
| salt spray test (DIN 50021) | | | | |
| bottom wall at the section = U | | | | |
| 240 h bright iron | | | | |
| 175° C. stoved U (mm) | corrosion | | 7–9 mm | 6–7 mm |
| 190° C. stoved U (mm) | 6–10 mm + blisters | | 4–5 mm | 2–4 mm |
| 360 h Bonder 127(*) | | | | |
| 175° C. stoved U (mm) | corrosion | | 4–6 mm | 4–5 mm |
| 190° C. stoved U (mm) | 1.5–3 mm | | 2–5 mm | 4–5 mm | sat. = satisfactory
(*) = unpolished side
(o) = foamy viscous solution after dilution, - not capable of deposition

We claim:

1. Heat-hardenable aqueous paint coating material, based on a vehicle mixture that has been made water-thinnable with acid and, optionally, customary additives, wherein said vehicle contains in combination (A) from 50 to 95% by weight of a polymer and/or polycondensate, containing tertiary amino-groups and OH-groups, (Component A), comprising the structural group and the amine number ranges from 10 to 120.

4. Paint coating material according to claim 1, characterized in that Component C possesses an amine number of from 0 to 250 and an OH-number of from 30 to 500.

5. Paint coating material according to claim 1, characterised in that Component A is a reaction product of polyglycidyl ethers with acrylic acid and/or methacrylic acid and secondary amines.

* * * * *